United States Patent [19]
Finke

[11] 3,752,087
[45] Aug. 14, 1973

[54] PALLET CONSTRUCTION FOR INCREASED DENSITY OF LOADING

[75] Inventor: Albert J. Finke, Ingomar, Pa.

[73] Assignee: Allis-Chalmers Corporation, Milwaukee, Wis.

[22] Filed: Nov. 9, 1971

[21] Appl. No.: 197,054

[52] U.S. Cl.......................... 108/59, 108/53, 108/56
[51] Int. Cl............................................. A47b 57/00
[58] Field of Search.......................... 108/51, 58, 59; 214/517

[56] References Cited
UNITED STATES PATENTS

| | | | |
|---|---|---|---|
| 622,666 | 4/1899 | Burwell................................. | 108/54 |
| 2,377,911 | 6/1945 | Warren................................. | 108/54 |
| 2,420,640 | 5/1947 | Acteson............................. | 108/55 X |
| 2,676,776 | 4/1954 | Townson.............................. | 108/53 |
| 2,693,926 | 11/1954 | Tatko................................... | 108/57 |
| 2,503,022 | 4/1950 | Benoist et al..................... | 108/56 X |
| 3,494,490 | 2/1970 | Shell .................................... | 108/55 |
| 3,552,761 | 1/1971 | Sjoblom................................ | 108/56 |
| 3,650,224 | 3/1972 | Petix..................................... | 108/56 |
| 3,091,195 | 5/1963 | Kenyon et al......................... | 108/53 |

*Primary Examiner*—Bernard A. Gelak
*Assistant Examiner*—Glenn O. Finch
*Attorney*—Lee H. Kaiser et al.

[57] ABSTRACT

A pallet structure for the simultaneous fork truck loading of a plurality of devices having projecting components on a truck trailer bed. Each device is secured to a skid sized so that a whole number of skids occupy the width of the trailer bed. A plurality of skids are nested on a master pallet with the projecting components of adjacent devices in interfitting relation. The plurality of skids are nested within skid receiving pockets on the master pallet so that adjacent skids abut, and cooperating surface means on the master pallet and on each skid prevent horizontal and vertical displacement of the skid relative to the master pallet, thereby permitting fork truck handling of the master pallet carrying a plurality of skids without danger of dropping one of the devices, reducing the number of trips required to load the trailer bed, and minimizing empty cargo space on the trailer bed.

27 Claims, 14 Drawing Figures

PATENTED AUG 14 1973

PALLET CONSTRUCTION FOR INCREASED DENSITY OF LOADING

This invention relates to material handling and more particularly to material handling pallets for vehicle loading.

BACKGROUND OF THE INVENTION

Pole type electrical distribution transformers have cylindrical casings from which cooling tubes, lightning arresters, insulating bushings or other components may project horizontally and are often damaged during shipping. In order to prevent damage in shipment, each transformer is secured by banding straps to a skid, or pallet larger in width and breadth than the components projecting from the sidewalls of the casing, and the perimeter of the transformer is surrounded by a paper box or wood crate sized to fit the individual transformer. The distribution transformers are often transported on flat bed truck trailers, and this pallet construction requires that a fork lift truck be driven onto the truck trailer bed each time that a transformer is loaded. As many as 72 trips are required to load a trailer. Further, distribution transformers are manufactured in a plurality of different kva sizes, thereby requiring a plurality of different skids, or pallets sized to the maximum perimeter of the transformer and not to the cargo space in the truck trailer. Such miscellaneous loading of a plurality of different size pallets not designed to fit the trailer often leaves substantial empty cargo space and requires end and side dunnage to prevent the cargo from shifting.

Material handling pallet structures have been used in which a plurality of skids are placed on a larger pallet to permit simultaneous loading of a plurality of devices, but such arrangements have been inherently dangerous because the skids are not secured to the larger pallet and further such arrangement wastes storage space in a vertical direction.

OBJECTS OF THE INVENTION

It is an object of the invention to provide an improved material handling pallet structure for apparatus having components projecting from the sidewalls thereof which obviates the necessity of surrounding the apparatus with a crate to prevent damage during shipping.

It is a further object of the invention to provide an improved material handling pallet structure for devices having components projecting from the sidewalls thereof which obviates the necessity of a pallet wider and broader than the projecting components and permits substantial reduction in the size of the pallets. A further object is to provide such an improved material handling pallet structure having devices with projecting components secured thereto which permits loading of the pallets with the projecting components of adjacent devices nested so that they do not interfere with each other. Another object is to provide such an improved material handling pallet structure which permits simultaneous loading of a plurality of devices by a fork lift truck or crane and substantially reduces the number of trips required to load a storage area such as a truck trailer. Still another object is to provide such an improved material handling pallet structure which is designed to fit the cargo space in a truck trailer so that empty cargo space is minimized and the necessity of dunnage is obviated.

A still further object of the invention is to provide an improved material handling pallet structure in which a plurality of skids are nested on and interlocked with a master pallet so that the danger of a skid falling off the master pallet during loading is obviated. Another object is to provide such an improved material handling pallet structure wherein a plurality of skids are so nested on a master pallet that minimum vertical storage space is utilized.

A further object of the invention is to provide an improved material handling pallet structure in which a plurality of skids are nested on a master pallet which is adapted to interlock with a rack on which the pallets may be stacked in tiers.

DESCRIPTION OF THE DRAWING

These and other objects and advantages of the invention will be more readily apparent from the following detailed description when considered in conjunction with the accompanying drawing wherein.

DETAILED DESCRIPTION

Figure 1:
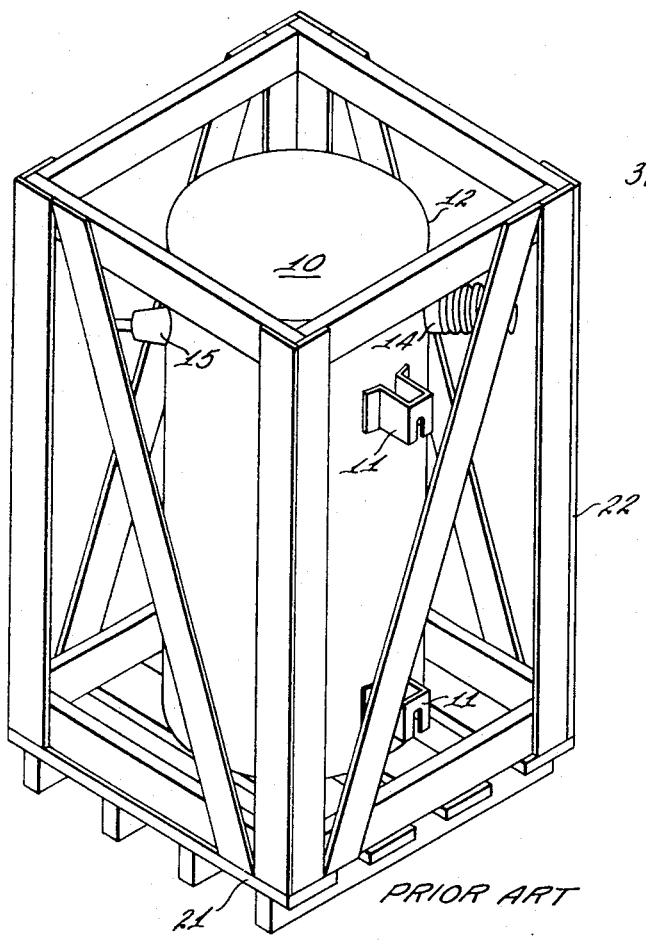
FIG. 1 is a perspective view of a distribution transformer supported on a prior art pallet and surrounded by a wooden crate to protect components projecting from the transformer during shipping.
Figure 2:
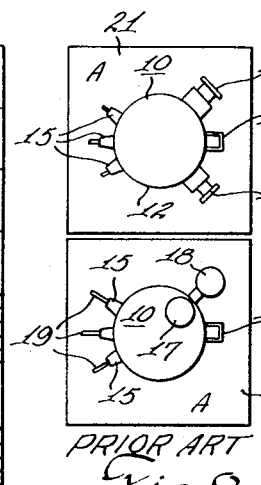
FIG. 2 is a plan view of two distribution transformers secured to prior art pallets, the crate surrounding each transformer not being shown.

Referring to FIGS. 1 and 2, the invention will be described with reference to the loading and transportation of electrical distribution transformers which have a cylindrical metallic casing 10 containing transformer oil (not shown) in which a transformer core and coil assembly (not shown) is immersed. The distribution transformer may have hanger brackets 11 projecting from the sidewall 12 of casing 10 to permit supporting the transformer on a pole. A typical distribution transformer may have a pair of high voltage sidewall insulating bushings 14 projecting horizontally from sidewall 12 and three low voltage insulating bushings 15 projecting horizontally from another portion of sidewall 12. Another typical distribution transformer may have a high voltage insulating bushing 17 (See FIG. 2) on the cover, a lightning arrester 18 projecting from sidewall 12, and three low voltage insulating bushings 15 with spade type terminals 19 projecting from another portion of sidewall 12. Other distribution transformers have still other components projecting horizontally from the casing sidewall such as cooling radiators (not shown), cooling fins (not shown), circuit breaker operating handles (not shown), and dual voltage switch actuating handles (not shown).

Figure 7:
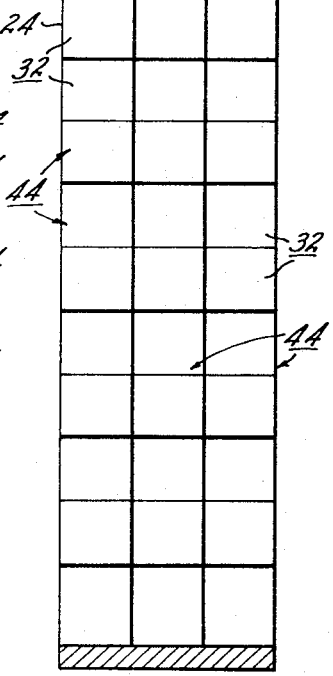
FIG. 7 schematically illustrates a plurality of prior art pallets stacked on a single large pallet.
Figure 7:
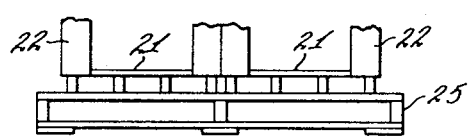

In order to assure that such components are not damaged during shipping, the transformers are conventionally secured to skids 21 shown in FIG. 1 having a horizontal length and breadth which is greater than the dimension of the transformers measured at such projecting members. Further, each transformer is usually surrounded by a wood crate 22 of a size selected to encompass the perimeter of the individual transformer. The transformer may be secured to the skid 21 by banding straps. Such known material handling pallet arrangement requires that a fork lift truck make a separate trip onto the bed 24 (See FIG. 3) of a truck trailer to load each skid 21 and the transformer supported thereon, and as many as 72 trips of a fork lift truck may be required to load the trailer bed. Attempts have been made to stack two or more skids 21 on a single large pallet 25 as schematically represented in FIG. 7 to permit handling of multiple transformers by a fork lift truck, but such arrangement is inherently unsafe because the skids 21 are not secured to the larger pallet 25. The improved material handling pallet construction of the invention nests a plurality of skids on a master pallet to reduce the height of the package and thus save storage space in the vertical direction and also locks the skids to the master pallet to eliminate the hazard of handling as described hereinafter.

Distribution transformers are manufactured in many different kva ratings, for example, in 5, 10, 15, 25, 37.5, 50, 75 and 100 kva ratings. The large number of different kva size transformers necessitates use of a plurality of different skids 21. For example, four different size skids 21 may be conventionally used for the different kva ratings of transformers as follows:

| TRANSFORMER KVA | SKID SIZE |
| --- | --- |
| 5 and 10 | A |
| 15 and 25 | B |
| 37.5 and 50 | C |
| 75 and 100 | D |

Figure 3:
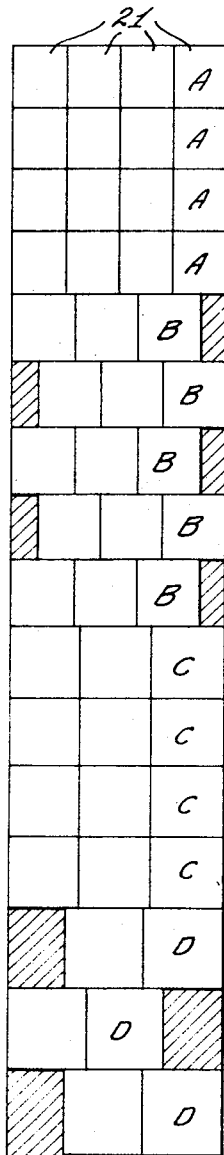
FIG. 3 is a plan view of the pallet load on the bed of a typical truck trailer with prior art pallets supporting distribution transformers.

FIG. 3 illustrates the bed 24 of a conventional truck trailer on which a plurality of each of the four different size prior art skids A, B, C and D are loaded. The skids A, B, C, D are sized in accordance with the perimeter of the individual transformer and are not designed to fit the cargo space in the truck trailer, and it will be noted that three side-by-side skids B do not extend the full width of the trailer bed 24 so that cargo space is wasted when size B skids are loaded on trailer bed 24. Further, two side-by-side skids D do not extend the full width of trailer bed 24 and result in unused cargo space and also require dunnage to prevent shifting of the cargo.

Figure 11:
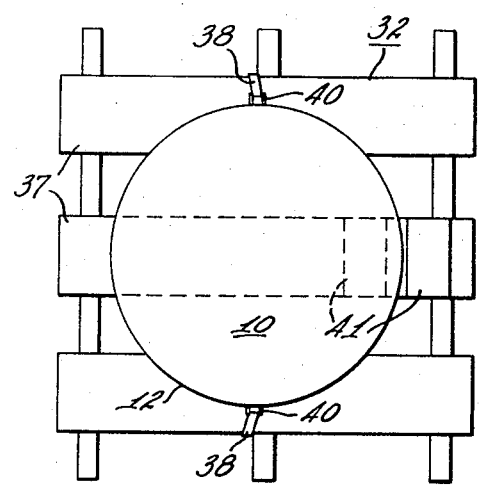
FIGS. 11 and 12 are plan and front views respectively of a typical distribution transformer banded to and blocked on a skid.
Figure 12:
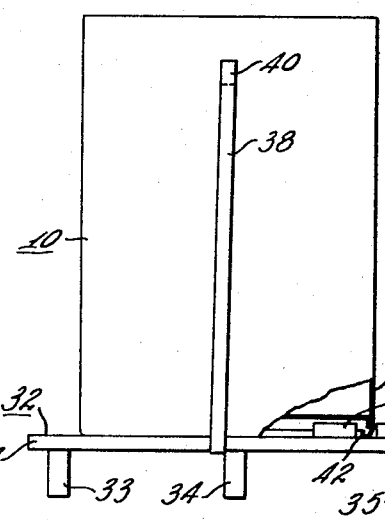
Figure 4:
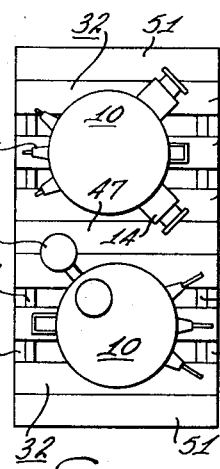
FIG. 4 is a plan view of two distribution transformers supported on individual skids which are nested on a master pallet in accordance with the invention.
Figure 5:
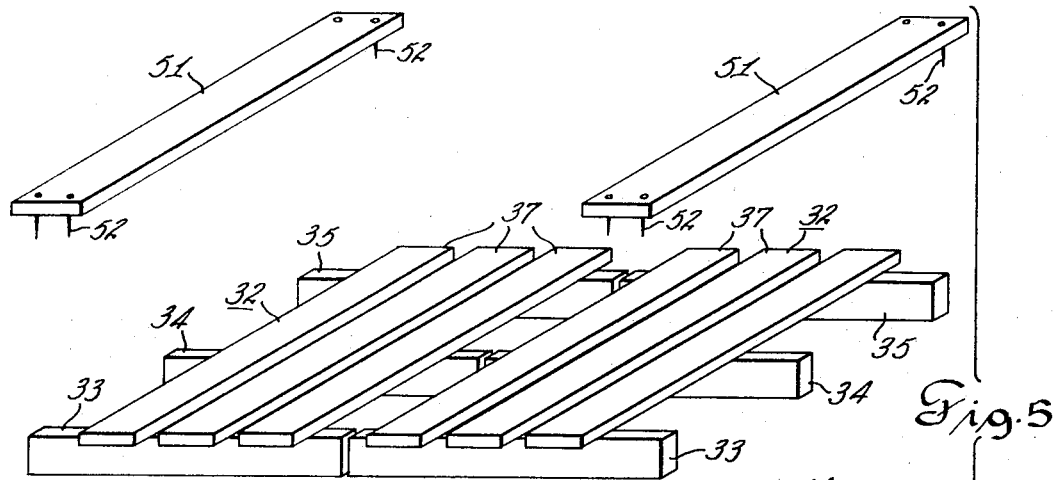
FIG. 5 is an exploded isometric view of the two-skid master pallet shown in FIG. 4 and the skids that are nested thereon.

In the improved pallet structure of the invention, skids 32 shown in FIGS. 4 and 5 support each transformer and may have a width and breadth which is less than the dimensions of the transformer measured at the projecting components (such as 11, 14, 15, 18 or 19) so that such components in the plan view of FIG. 4 project beyond an edge of the skid 32 and overlap an adjacent skid 32. Each skid 32 may comprise three parallel, spaced-apart longitudinally extending stringers, or runners 33, 34 and 35 (See FIG. 5) of wood or other suitable material. A plurality of deck boards 37 of wood or other suitable material extend transversely across the upper edges of the runners 33, 34 and 35 and are secured thereto by nails or other suitable fastening means so that the ends of the deck boards 37 preferably protrude beyond the side runners 33 and 35 and also so that the ends of the runners 33, 34 and 35 extend beyond the deck boards 37. Each transformer may be affixed to a skid 32 by a steel banding strap 38 (See FIGS. 11 and 12) extending beneath the deck boards 37 and secured to lifting hooks 40 welded to casing sidewall 12 and which are used in the field to lift a transformer to the top of a pole by means of a sling or a gin. A pair of wooden blocks 41 may be nailed to one of the deck boards 37 radially inwardly and radially outward from the lower turned-over edge 42 of casing sidewall 12 as shown in FIG. 12 to limit movement of the transformer on skid 32.

A pair of skids 32 are adapted to be nested end-to-end on a master pallet 44 as shown in FIG. 4, and each skid 32 is illustrated supporting a larger kva transformer than the same size prior art pallet 21 shown in FIG. 2. Master pallet 44 may comprise a plurality of transverse base boards or planks 45 (See FIG. 5) of suitable material such as wood secured by suitable fastening means such as nails to a pair of longitudinal side stringers 46 of suitable material such as wood. The longitudinal stringers 46 of master pallet 44 are spaced a sufficient distance so that the side runners 33 and 35 of the skids 32 fit inwardly from stringers 46 with the deck boards 37 of the skids 32 resting on the stringers 46 of the master pallet 44, thereby preventing horizontal displacement of skids 32 relative to master pallet 44 in the transverse direction.

As best seen in FIG. 4, the skids 32 are assembled on master pallet 44 so that the projecting components (e.g., lightning arrester 18) on each transformer overlap (in plan view) the adjacent skid 32 on the master pallet 44, and interfit with the projecting components (e.g, primary sidewall bushing 14 and secondary bushings 15) of adjacent transformers, thereby permitting material reduction in the size of the skids and an increase in the number of skids that may be loaded on the trailer bed. The side runners 33 and 35 are spaced from the central runner 34 on each skid 32 so that the fork of a lift truck may be inserted between the runners 33, 34 and 35 a sufficient distance so that the pair of end-to-end skids 32 may be simultaneously lifted by the truck fork.

Master pallet 44 also includes a transverse horizontal support board 47 of suitable material such as wood fastened at its ends by suitable means such as nails to the upper edge of longitudinal stringers 46 midway of their length. The ends of runners 33, 34 and 35 of the skids 32 protrude beyond the deck boards 37 and extend beneath transverse support board 47 of master pallet 44 to prevent vertical displacement of skids 32 relative to master pallet 44. The truck fork extends beneath transverse support board 47, and the ends of runners 33, 34 and 35 of the individual skids 32 also extend beneath horizontal support board 47 so that master pallet 44 is lifted with the skids 32 by the truck fork.

The adjacent ends of runners 33, 34 and 35 of the pair of end-to-end skids 32 abut beneath transverse horizontal support board 47 of master pallet 44 so that storage space is minimized in a direction longitudinal of master pallet 44. At their remote ends the runners 33, 34 and 35 of the skids 32 protrude beyond the deck boards 37 parallel to the longitudinal stringers 46 of the master pallet 44. Transverse horizontal flat end support boards 51 are secured by suitable releasable fastening means such as nails 52 to the upper edges of the stringers 46 of master pallet 44. The transverse end support boards 51 are disposed above the protruding ends of the runners 33, 34 and 35 of the skids 32 and abut against the deck boards 37 of the skids 32 and thus restrain movement of the skids 32 longitudinally of the master pallet 44 and also prevent vertical displacement of skids 32 relative to master pallet 44. It will be appreciated that the longitudinal stringers 46 together with the transverse horizontal board 47 and transverse end boards 51 define a pair of skid receiving pockets on master pallet 44. It will also be appreciated that the transverse horizontal board 47 and transverse end boards 51 are in the same horizontal plane as the platform defined by deck boards 37 of skids 32 so that storage space in a vertical direction is minimized.

Figure 6:
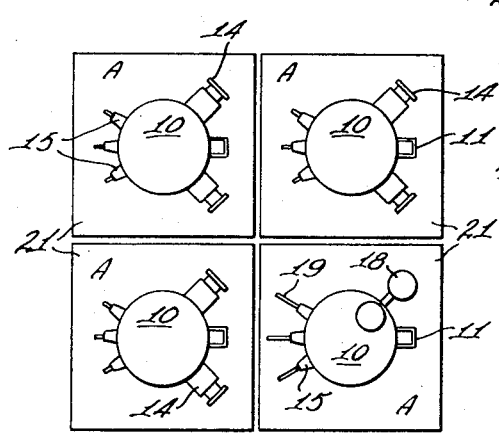
FIG. 6 is a plan view of four distribution transformers secured to prior art pallets, the crates around each transformer not being shown.
Figure 8:
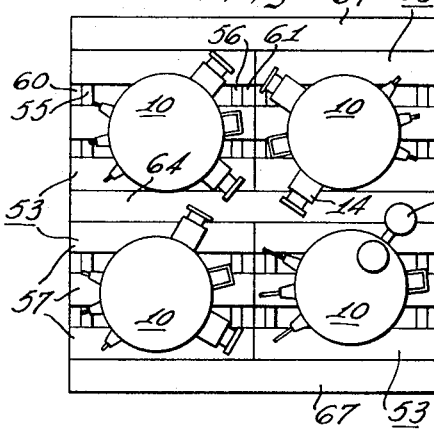
FIG. 8 is a plan view of four distribution transformers supported on individual skids which are nested on a four-skid master pallet in accordance with the invention.

FIG. 6 illustrates four 10 kva distribution transformers 10 supported on size A prior art skids 21 whose width and breadth are greater than the dimensions of the transformers measured at the projecting components, such as the lightning arrester 18 and sidewall high voltage bushings 14. FIG. 8 illustrates four 25 kva distribution transformers secured to individual skids 53 nested in a master pallet 54 in accordance with the invention so that the four skids 53 form a generally square unit and so that the projecting components (such as 14 or 18) on each transformer overlaps an adjacent skid 53 and interfits with the projecting components of the transformers on the adjacent skids. The skids 53 are the same size as the prior art skids 21 shown in FIG. 6 and are similar to skids 32 shown in FIGS. 4 and 5 except that the center runner is eliminated. Skid 53 comprises a pair of spaced side runners 55 and 56 (See FIG. 9) of suitable material such as wood to the upper edge of which a plurality of deck boards 57 are fastened by suitable means such as nails. Master pallet 54 preferably may have three flat horizontal base boards, or planks 59 of suitable material such as wood secured at their ends by suitable fastening means such as nails to the lower edges of a pair of longitudinal stringers 60 of suitable material such as wood. Base boards 59 may also be affixed midway of their length by suitable fastening means such as nails to a pair of back-to-back longitudinal central stringers 61. The central stringers 61 are spaced from side stringers 60 so that the side stringers 55 and 56 of a skid 53 may fit therebetween and a pair of skids 53 may be nested side-by-side in a transverse direction in master pallet 54 so that horizontal displacement of skids 53 in said transverse direction relative to said master pallet 54 is prevented. Master pallet 54 also includes a transverse horizontal support board 64 of suitable material such as wood fastened at its ends by suitable fastening means such as nails to the upper edges of longitudinal stringers 60 and also fastened midway of its length to both central stringers 61. The ends of the side runners 55 and 56 of the four skids 53 extend beyond the deck boards 57 and fit beneath transverse support board 64 of master four-skid pallet 54, thereby restraining horizontal displacement of skids 53 in a longitudinal direction relative to master pallet 54 and also preventing vertical displacement of skids 53 relative to master pallet 54. The truck fork extends beneath transverse support board 64 when the four transformers on skids 53 are being simultaneously lifted by the lift truck fork, and the ends of the side runners 55 and 56 on each of the four skids 53 also fits beneath transverse support board 64 so that four-skid master pallet 54 is lifted simultaneously with the four skids 53.

The ends of the side runners 55 and 56 of each of the four skids 53 which protrude beyond the deck boards 57 thereof extend parallel to the longitudinal stringers 60 of master pallet 54. Transverse horizontal flat end support boards 67 are secured by suitable releasable fastening means such as nails 68 to the upper edges of the longitudinal stringers 60. The transverse end support boards 67 are disposed above the protruding ends of the side runners 55 and 56 of each of the four skids 53 and abut against the deck boards 57 of each of the four skids 53. The nails 68 prevent movement of the transverse end boards 67 relative to master pallet 54 and thus interlock the four skids 53 with master pallet 54. It will be appreciated that the longitudinal stringers 60 and 61 together with the transverse support board 64 and end transverse boards 67 define four skid receiving pockets on master pallet 54. It will also be appreciated that the four skids 53 are nested side-by-side and end-to-end on master pallet 54 so that storage space is minimized in a horizontal direction and also that the transverse boards 64 and 67 are in the same horizontal plane as deck boards 57 which define the horizontal support platforms on the skids 53 so that vertical storage space is minimized.

Figure 10:
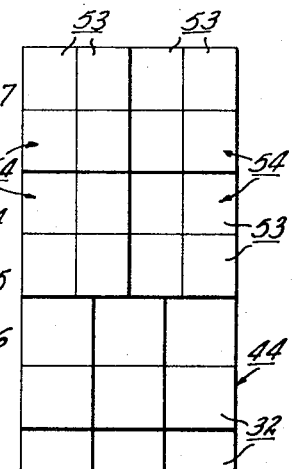
FIG. 10 is a plan view of the bed of a typical truck trailer loaded with the improved material handling pallet structures of the invention.
Figure 9:
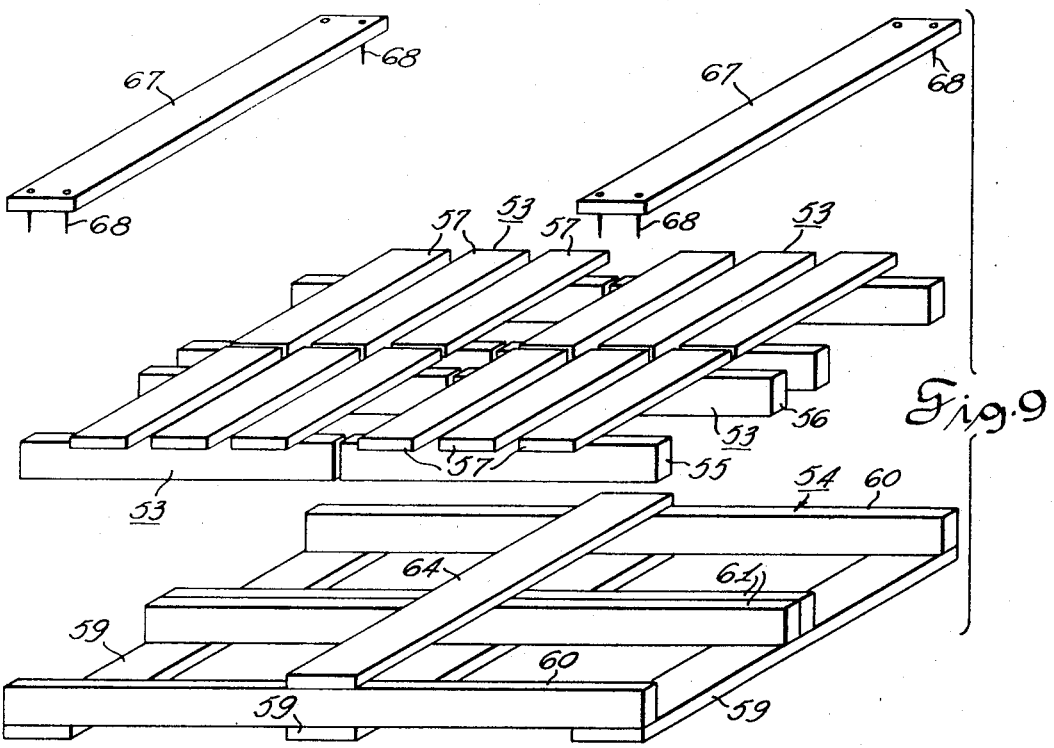
FIG. 9 is an exploded isometric view of the four-skid master pallet shown in FIG. 8 and the skids that are nested thereon.

The master pallet structure shown in FIGS. 8 and 9 permits simultaneous loading of four distribution transformers by a fork lift truck so that only one trip is required instead of four as were necessitated by the prior art arrangement. FIG. 10 is a plan view of the typical (8 feet by 40 feet) bed 24 of a truck trailer which has been loaded with pallet structures embodying the invention. The overlapping of the projecting components on a transformer with an adjacent skid 53 permits the loading of transformers of 5, 10, 15 or 25 kva rating on a skid 53 of the size designated A in FIG. 3, thereby eliminating the size B skids shown in FIG. 3 which resulted in wasted cargo space when three size B skids were loaded side-by-side on bed 24. The trailer bed load shown in FIG. 10 includes four master pallets 54 on each of which are nested four skids 53 which may support transformers of 5, 10, 15 or 25 kva rating. The trailer bed load illustrated in FIG. 10 includes 18 two-skid master pallets 44 on each of which are nested a pair of size C skids 32 that support either a 37.5 or a 50 kva transformer. The overlapping of the projecting components with an adjacent skid 32 permits reduction of the size D skids so that three size D skids 32 may be loaded side-by-side in a transverse direction across the trailer bed 24 as shown in FIG. 10 without loss of cargo space, and each size D skid 32 may support a distribution transformer of 75 kva or 100 kva rating.

A substantially greater percentage of the available cargo space on the trailer bed 24 is used when it is loaded with the improved pallet construction of the invention, as illustrated in FIG. 10, in comparison to the loading of the same trailer bed 24 with prior art pallets 21 as shown in FIG. 3.

Figure 13:
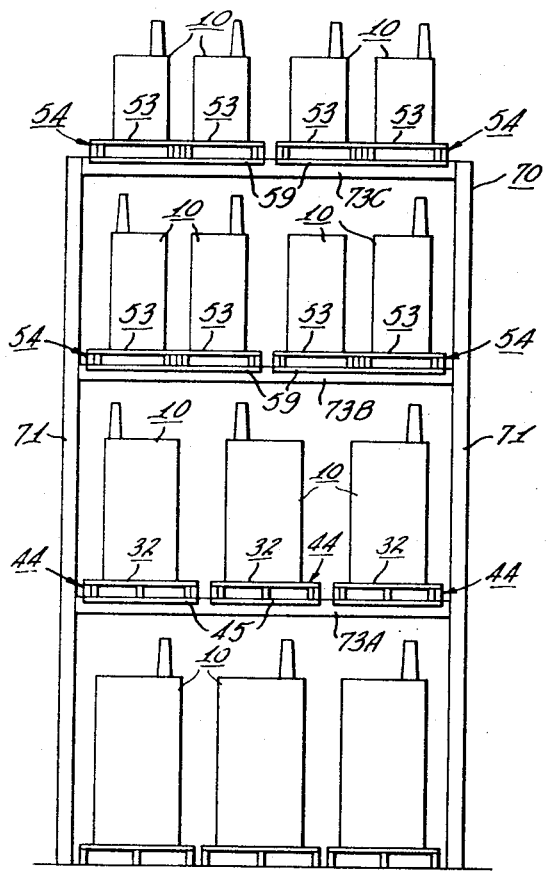
FIGS. 13 and 14 are front and side views respectively of a rack upon which pallets embodying the invention are stacked in tiers.
Figure 14:
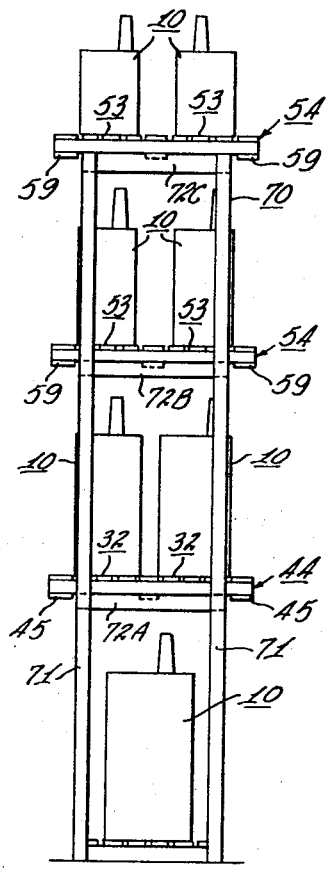

FIGS. 13 and 14 are front and side views respectively of a rack 70 upon which pallets embodying the invention are stacked in tiers. Rack 70 may comprise four structural iron corner posts 71 connected by structural iron horizontal end members 72A, 72B and 72C and side members 73A, 73B and 73C affixed at vertically spaced apart points to corner posts 71. Two master pallets 54 are illustrated supported on the side members 73C of the upper tier, and each master pallet 54 has four skids 53 nested thereon with each skid 53 supporting a distribution transformer 10 which may be of 15 kva size. It will be noted that the end floor boards 59 of the master pallets 54 depend below the upper edge of side members 73C to interlock the master pallets 54 with rack 70. Two master pallets 54 are illustrated supported on the side members 73B of the next tier of rack 70, and each master pallet 54 has four skids 53 nested thereon with each skid 53 supporting a distribution transformer 10 which may be of 25 kva size. Three master pallets 44 are shown supported on the side members 73A of the second tier of rack 70, and each master pallet 44 has two skids 32 nested thereon with each skid 32 supporting a distribution transformer 10 which may be of 50 kva size. It will be noted that the end floor boards 45 of master pallets 44 depend below the upper surface of side members 73A to interlock the master pallets 44 with rack 70.

It should be understood that I do not intend to be limited to the particular embodiments shown and described for many modifications will be obvious to those skilled in the art.

The embodiments of the invention in which an exclusive property or privilege is claimed are defined as follows:

1. A pallet structure for the simultaneous loading of a plurality of devices comprising, in combination,
 a plurality of skids each of which has a raised horizontal platform for supporting one of said devices, and
 a master pallet having a plurality of skid receiving pockets each of which detachably receives one of said skids and is at least partially defined by vertical wall portions which interfere with and restrain displacement of said skid in a horizontal direction relative to said master pallet, said plurality of skids being detachably nested in said pockets side-by-side in a horizontal plane on said master pallet so that at least one side of each skid is closely contiguous the side of another skid on said master pallet to thereby minimize the storage space occupied by said master pallet with said plurality of skids nested thereon, whereby said plurality of skids may be simultaneously lifted together with said master pallet by a fork lift truck for transportation and said skids may also be used separately for distribution of the devices supported thereon.

2. A pallet structure in accordance with claim 1 and including cooperating surface means on said master pallet and on each said skid for restraining vertical movement of said skid relative to said master pallet.

3. A pallet structure in accordance with claim 1 having cooperating surface means on said master pallet and on each said skid for restraining movement of said skid relative to said master pallet in two horizontal directions orthogonal to each other and including a horizontal support member releasably secured to said master pallet so that it partially defines said pocket in which said skid is received.

4. A pallet structure in accordance with claim 1 wherein each of said skid receiving pockets in said master pallet is partially defined by a pair of spaced parallel vertical wall portions and each said skid has a pair of vertical wall portions and each said skid has a pair of depending parallel leg portions fitting between said vertical wall portions and spaced apart to receive the fork of a lift truck inserted therebetween and beneath said horizontal platform, and wherein said master pallet has a horizontally extending opening to each said skid receiving pocket permitting insertion of said lift truck fork beneath said platform of said skid nested within said pocket.

5. A pallet structure in accordance with claim 1 wherein said master pallet has a plurality of said skid receiving pockets in a longitudinal direction and also has a plurality of said pockets in a transverse direction and said plurality of skids are releasably nested end-to-end and side-by-side on said master pallet in the same horizontal plane so that one side of each skid is closely adjacent the side of another said skid in said longitudinal direction and another side thereof is closely adjacent the side of another skid in said transverse direction.

6. A pallet structure in accordance with claim 1 and including a plurality of devices each of which is adapted to be supported on one of said skids and has a component projecting horizontally therefrom beyond the upper surface of said skid when it is so supported, and means for securing one of said devices on each of said skids nested on said master pallet so that said projecting component is in noninterfering relation with the projecting component on the device secured to an adjacent skid.

7. A pallet structure in accordance with claim 2 wherein said cooperating surface means prevent movement of each said skid relative to said master pallet in three directions orthogonal to each other and includes a horizontal support member partially defining said pocket in which said skid is received and being releasably secured to said master pallet.

8. A pallet structure in accordance with claim 4 wherein each said pair of spaced vertical wall portions on said master pallet comprise a pair of parallel spaced apart longitudinal stringers which partially define at least two of said skid receiving pockets and wherein said depending parallel leg portions on each said skid comprise a pair of parallel spaced apart longitudinal side runners adapted to fit between said longitudinal stringers on said master pallet to restrain horizontal movement of said skid relative to said master pallet in a direction perpendicular to said longitudinal stringers.

9. A pallet structure in accordance with claim 4 and including cooperating surface means on said master pallet and on each said skid for restraining movement of said skid in a vertical direction relative to said master pallet.

10. A pallet structure in accordance with claim 8 wherein said master pallet has a horizontal support member transverse to and affixed to the upper surface of said longitudinal stringers and wherein the ends of said side runners of said skids are adapted to fit beneath said horizontal support member to restrain upward movement of said skids relative to said master pallet.

11. A pallet structure in accordance with claim 4 wherein said master pallet includes at least three parallel longitudinal stringers spaced apart in a transverse direction and each adjacent pair of said stringers partially define at least two of said skid receiving pockets in a direction longitudinal of said master pallet.

12. A pallet structure in accordance with claim 10 wherein said horizontal platform on each said skid is defined by a plurality of deck boards affixed to said side runners and said deck boards on each said skid are adapted to abut against said horizontal support member on said master pallet to restrain horizontal displacement of said skid relative to said master pallet in a direction parallel to said longitudinal stringers.

13. A pallet structure in accordance with claim 12 wherein said deck boards of each said skid extend beyond said side runners and rest upon said longitudinal stringers of said master pallet.

14. A pallet structure in accordance with claim 13 and including a plurality of transverse horizontal end members each of which is releasably attached to the upper surface of said longitudinal stringers at the end of each said skid remote from said horizontal support member and being disposed above said side runners of said skid, said horizontal support member and each said transverse end member being approximately in the same horizontal plane as said deck boards of each skid nested on said master pallet, whereby minimum storage space in a vertical direction is occupied by said master pallet with said plurality of skids nested thereon and restrained from movement relative to said master pallet in three mutually orthogonal directions.

15. A pallet structure in accordance with claim 14 wherein said master pallet includes at least three parallel longitudinal stringers spaced apart in a transverse direction and each pair of adjacent stringers partially defines at least two of said skid receiving pockets on said master pallet and wherein said horizontal support member and said end members extend in said transverse direction above all of said longitudinal stringers.

16. A pallet structure for the simultaneous fork truck loading of a plurality of devices comprising, in combination,
a plurality of skids each of which has a pair of spaced horizontal longitudinal side runners and a plurality of transverse deck boards affixed to the upper edge of said side runners so that said side runners extend beyond said deck boards, and
a master pallet having a plurality of spaced apart elongated longitudinal stringers, a transverse horizontal support member disposed above and affixed to the upper edge of said longitudinal stringers midway of their ends, adjacent longitudinal stringers of said master pallet being spaced a greater distance than said side runners of said skids, said plurality of skids being releasably nestable in said master pallet side-by-side in the same horizontal plane with said side runners disposed between said longitudinal stringers and with the extending ends of said side runners disposed beneath said transverse support member, whereby said plurality of skids may be simultaneously lifted together with said master pallet by a fork lift truck for transportation and said skids may also be used separately for distribution of the devices supported thereon.

17. A pallet structure in accordance with claim 16 wherein a plurality of said skids are nestable end-to-end in said master pallet and including a pair of elongated transverse flat end boards each of which is positioned above said longitudinal stringers adjacent the ends thereof in the same horizontal plane as said desk boards and above the extending portion of the side runners of at least one of said skids, and means for releasably securing said transverse end boards to said longitudinal stringers of said master pallet, whereby said desk boards of each skids abut against said transverse end boards and movement if said skids longitudinally and laterally and vertically relative to said master pallet is prevented.

18. A pallet structure in accordance with claim 17 wherein a pair of skids are nestable end-to-end between each pair of adjacent longitudinal stringers of said master pallet with the extending ends of said side runners of said pair of skids disposed beneath said transverse support board and a plurality of said skids are nestable in said master pallet side-by-side in a transverse direction and each of said transverse end boards is positioned above the extending portions of the side runners of a plurality of side-by-side skids.

19. A pallet structure in accordance with claim 16 for loading on the bed of a truck trailer wherein the transverse dimension of said master pallet is approximately equal to the fraction $1/n$ of the width of said trailer bed, where $n$ is an integer.

20. A pallet structure in accordance with claim 16 wherein said master pallet has a central and two side longitudinal stringers with said central stringer spaced from each of said side stringers a greater distance than the spacing of said side runners of said skids and four of said skids are nestable on said master pallet in the same horizontal plane with a pair of said skids disposed end-to-end between said central longitudinal stringer and each said side longitudinal stringer and with the extending ends of said side runners of each of said four skids disposed beneath said transverse support board.

21. A pallet structure in accordance with claim 16 wherein said master pallet has a plurality of flat horizontal transverse base boards disposed beneath and affixed adjacent their ends to said longitudinal stringers and wherein said base boards are spaced apart in a direction longitudinal of said stringers and said side runners of each said skid are disposed above said base boards.

22. A pallet structure for the simultaneous loading of a plurality of devices comprising, in combination,
a plurality of skids each of which has a pair of spaced horizontal parallel longitudinal side runners and a plurality of transverse deck boards affixed to the upper edge of said side runners to that said deck boards extend beyond said side runners and said runners extend beyond said deck boards, and
a master pallet comprising a plurality of flat horizontal transverse floor boards affixed adjacent their ends to a plurality of spaced apart elongated parallel longitudinal stringers disposed above said floor boards, a transverse flat horizontal support board disposed above and affixed to the upper edge of said longitudinal stringers midway of their ends, adjacent longitudinal stringers of said master pallet being spaced a greater distance than said side runners of said skids, said plurality of skids being releasably nestable in said master pallet end-to-end in the same horizontal plane with said side runners disposed between said longitudinal stringers and above said floor boards and with the extending ends of said side runners disposed beneath said transverse support board and with the extending ends of said deck boards resting upon adjacent longitudinal stringers, whereby said plurality of skids may be lifted simultaneously together with said master pallet by a fork lift truck for transportation and said skids may also be used separately for distribution of the devices supported thereon.

23. A pallet structure in accordance with claim 24 and including a pair of transverse end boards each of which is positioned above one end of said longitudinal stringers of said master pallet and also above said side runners of at least one of said skids, and means for releasably securing each of said transverse end boards to said longitudinal stringers of said master pallet.

24. A pallet structure in accordance with claim 25 wherein each of said skids has a pair of spaced side runners disposed inwardly of a pair of adjacent longitudinal stringers of said master pallet and extending beneath said transverse horizontal support member and a plurality of transverse deck boards affixed to the upper edge of said side runners and protruding beyond said side runners and resting on the upper edge of said pair of adjacent longitudinal stringers of said master pallet.

25. A pallet structure in accordance with claim 26 wherein each said master pallet includes a plurality of flat horizontal transverse floor boards affixed to a plurality of spaced apart longitudinal stringers disposed above said floor boards and a transverse flat horizontal support member disposed above and affixed to the upper edge of said longitudinal stringers midway of their length.

26. A pallet structure having a plurality of master pallets as defined in claim 6 positioned side-by-side on a vehicle bed, the width of each of said master pallets being approximately equal to the fraction $1/n$ of the width of said vehicle bed, where n is an integer greater than one, and the width of each of said skids as defined in claim 28 being approximately equal to the fraction $1/y$ of the width of said master pallet on which it is secured, where $y$ is an integer greater than one.

27. A pallet structure in accordance with claim 22 and including a plurality of transverse horizontal end members each of which is detachably affixed to the upper surface of said longitudinal stringers at the end of each said skid remote from said horizontal support member and being disposed above the side runners of said skid in approximately the same horizontal plane as said deck boards of said skid.

* * * * *

PO-1050
(5/69)

UNITED STATES PATENT OFFICE
CERTIFICATE OF CORRECTION

Patent No. 3,752,087     Dated August 14, 1973

Inventor(s) Albert J. Finke

It is certified that error appears in the above-identified patent and that said Letters Patent are hereby corrected as shown below:

Column 9, line 8, "claim 4" should read --- claim 9 ---. Column 10, line 11, "desk" should read --- deck ---; line 15, "desk" should read --- deck ---; line 59, "to" should read --- so ---. Column 12, line 18, "claim 28" should read --- claim 6 ---.

Signed and sealed this 2nd day of April 1974.

(SEAL)
Attest:

EDWARD M. FLETCHER, JR.
Attesting Officer

C. MARSHALL DANN
Commissioner of Patents